United States Patent [19]
Fütterer

[11] Patent Number: 6,126,710
[45] Date of Patent: Oct. 3, 2000

[54] METHOD OF PRODUCING A SINTERED SLIDE BEARING AND SLIDE BEARING

[75] Inventor: Bodo Fütterer, Lucerne, Switzerland

[73] Assignee: Maxon Motor GmbH, Sexau, Germany

[21] Appl. No.: 09/285,449

[22] Filed: Apr. 2, 1999

[30] Foreign Application Priority Data

Apr. 7, 1998 [DE] Germany ............................ 198 15 648

[51] Int. Cl.$^7$ ....................................... B22F 3/00
[52] U.S. Cl. ................................ 75/246; 75/244; 75/236; 419/2; 419/12; 419/13; 419/14
[58] Field of Search ................................ 419/12, 13, 14; 75/236, 244

[56] References Cited

U.S. PATENT DOCUMENTS 4,775,596  10/1988  Holleran et al. ......................... 428/432

FOREIGN PATENT DOCUMENTS

| 0 620 286 | 10/1994 | European Pat. Off. . |
| 0 703 382 | 3/1996 | European Pat. Off. . |
| 38 22 919 | 1/1990 | Germany . |
| 197 38 919 | 4/1999 | Germany . |
| 9-184037 | 7/1997 | Japan . |
| 9-260556 | 10/1997 | Japan . |

OTHER PUBLICATIONS

"Titanium Diboride Copper–Matrix Composites", P.Yih et al., Journal of Materials Science vol. 32, 1997, pp. 1703–1709.

*Primary Examiner*—Ngoclan Mai
*Attorney, Agent, or Firm*—Burns, Doane, Swecker & Mathis, L.L.P.

[57] ABSTRACT

A method of producing a composite material, in particular for sintered slide bearings and slide bearings.

Composite materials for sintered slide bearings consist of at least one ceramic sintered material and at least one metallic sintered material and have a short service life during operation at low speeds of the shaft and in the case of a simultaneously high radial load because the lubricant stored in the bearing cracks. The novel sintered bearing is to have a long service life under such operating conditions.

In the novel bearing use is made of ceramic sintered materials which have a high thermal conductivity, e.g. boron nitride.

The novel composite material and the novel slide bearing are particularly suited for electric miniature motors comprising a ceramic shaft.

11 Claims, No Drawings

METHOD OF PRODUCING A SINTERED SLIDE BEARING AND SLIDE BEARING

The present invention relates to a method of producing a composite material, in particular for sintered slide bearings with ceramic shafts, wherein a metallic sintered material in powder form is first mixed with a ceramic sintered material in powder form, subsequently introduced into a predetermined mold and is then sintered, and to a slide bearing, in particular for ceramic shafts consisting of a sintered mixture formed from at least one metallic material and from at least one ceramic material.

Such composite materials and slide bearings are known. DE 38 22 919 C2, for instance, describes a slide bearing for electric miniature motors with a pore amount of 10% to 30%. These pores are impregnated with oil for the supply of lubricant to the bearing. The slide bearing is made from a composite material which consists of metal particles and silicon nitride particles. The grain size of the sintered powder of silicon nitride is 250 $\mu$m.

The silicon nitride particles make the bearing sufficiently hard against frictional wear. The metal particles enhance the toughness of the composite material and improve the mechanical loadability of the slide bearing.

The generic bearings are not suited for unsteady operation, i.e. operation with frequent start and braking operations, nor for use at low speeds of the shaft and simultaneously high transverse forces. During permanent operation under such conditions the service life of these bearings is very short because after a certain running period the lubricant contained in the bearing will crack, i.e. its molecular long-chain structure breaks, and will thus lose its lubricating power. As a consequence, the bearing wears considerably.

What is typical of the operation at low speeds and a high transverse force is the at least temporary breakdown of the lubricating film which in slide bearings builds up in the bearing gap between slide bearing and shaft due to the rotational movement of the shaft and carries the shaft without any contact with the slide bearing shell.

German patent application 197 38 919.8 discloses a slide bearing which is designed for operation at low speeds and simultaneously high radial loads. This slide bearing entirely dispenses with the admixture of ceramic powders, but uses, instead of said powders, a hardenable metallic material which is hardened subsequent to the sintering process.

This slide bearing has the decisive drawback that the hardening process constitutes an additional manufacturing step which increases the production costs. Moreover, internal stresses are produced within the slide bearing because of the hardening process, the stresses being detrimental to the dimensional stability of the bearing. This dimensional stability of the slide bearing, however, is a decisive parameter which influences the service life of the slide bearing because the exact size of the gap between slide bearing and shaft determines the supporting process of the bearing.

It is therefore the object of the present invention to provide a slide bearing and a method of producing a sintered slide bearing which at low production costs and at a number of steps that is as small as possible has a long service life during operation at low speeds of the shaft and a simultaneously high transverse force.

According to the invention this object is achieved in a method of the above-mentioned type for producing a composite material for slide bearings in that the thermal conductivity of the ceramic sintered material is at least 50 W/(m K).

According to the invention this object is achieved by a slide bearing of the above-mentioned type in that the thermal conductivity of the ceramic material is at least 50 W/(m K).

The two solutions are simple and, surprisingly enough, have the effect that during continuous operation at low speeds of the shaft and at a high transverse load the lubricant no longer cracks and that a measurable wear is no longer detected on the bearing.

Therefore, an immediate advantage of the present invention is a long service life of the slide bearing according to the invention or of the slide bearing produced according to the invention at simultaneously reduced production costs in comparison with known hardened slide bearings consisting of metal.

Tests have led to the result, which is surprising for the inventor, that the service life of the slide bearing according to the invention increases in the case of mixed friction, i.e. without a supporting oil film in the bearing, to 2000 h in comparison with 80 h for former bearings known from the prior art. This seems to be due to the considerably improved thermal conductivity of the ceramic material which prevents heat peaks by rapidly carrying off the heat before the lubricant cracks.

As for the wear of the slide bearing, the hardness of the ceramic material seems to be of less importance, in comparison with the thermal conductivity, than has so far been assumed in slide bearing engineering.

Expediently, the inventive composite materials and the inventive slide bearings, respectively, are used in electric miniature motors.

In a particularly advantageous development of the method, the ceramic sintered material can be mixed with the metallic sintered material in a volume ratio of 1:25 to 1:3. Normally, the ceramic sintered material is brittle, whereas the metallic sintered material exhibits a certain ductility. Therefore, to avoid fracture caused by brittleness in case of a possible sudden load on the bearing, the amount of the metallic sintered material should be within the defined limits. These mixing ratios have turned out to be advantageous since the metallic sintered material is thus capable of elastically carrying sudden loads without any decrease in the hardness of the sintered bearing.

In a further advantageous development the composite material and the slide bearing, respectively, may have an open pore volume of 10% to 30%. This range has turned out to be suitable because a good absorbency of the composite material and the slide bearing, respectively, with respect to the lubricant is combined with a great strength.

Furthermore, it is advantageous when the thermal conductivity of the ceramic sintered material is at least 70 W/(m K), preferably 100 W/(m K). It has been found that the service life of the slide bearing increases with an increasing thermal conductivity of the ceramic sintered material, in particular during operation at low speeds and in the case of a simultaneously high radial load.

The thermal conductivity of the substance on dense bodies is here measured. In case of an anisotropic thermal conductivity, i.e. varying thermal conductivity in different directions of the material, as is e.g. observed in the case of boron nitride, the thermal conductivity is measured in the direction in which it assumes its maximum value. In the case of boron nitride, this is e.g. in a direction perpendicular to the pressing direction.

In further developments the ceramic material may consist of aluminum nitride, titanium diboride, boron nitride and/or beryllium oxide. Furthermore, silicon-filtered, hot-pressed or hot-isostatically pressed silicon carbide can be used as the ceramic materials. In tests all of these materials have turned out to be very advantageous over other materials as they increase the service life and loadability of the slide bearing at low speeds of the shaft.

To obtain an optimum combination of hardness resulting from the ceramic sintered material and of ductility resulting from the metallic sintered material in the bearing according to the invention, a mixing ratio between the ceramic sintered material and the metallic sintered material may range from 1:25 to 1:3. These values have turned out to be advantageous in tests.

The invention will now be described in more detail with reference to an example.

To produce the bearing as has been described by way of example, powder of a hardenable bronze with a mean grain size of 50–60 μm is e.g. mixed with globules of boron nitride of a grain size of 3 μm in the ratio of three volume parts of bronze to one volume part of boron nitride. Attention must here be paid to a homogeneous distribution of the boron nitride powder within the powder mixture.

The mixture is subsequently filled into a mold corresponding to the bearing to be produced, and is pressed. After the compact has been removed from the mold, the compact is sintered. This sintering process is substantially the same as in the case of conventional sintered bearings.

To obtain the desired fitting dimension for the shaft-bearing combination, the bore of the bearing is then calibrated. This process is standard in conventional sintered bearings. A correspondingly calibrated mandrel is pulled through the bore of the bearing.

The bearing is subsequently impregnated with oil. As a result, the oil deposits in the open pore space of the sintered bearing. To this end the bearing is expediently provided with an open minimum pore volume of 15%.

The bearing is now ready for use.

It becomes apparent from the above that the production of the slide bearing according to the invention is very simple. Moreover, it is substanially carried out with the same means as in conventional sintered bearings.

Like the conventional sintered bearings such a bearing has the advantage that the inner surface of the bore of the bearing has provided thereon hard supporting particles of ceramics or oxide metal which together with the used ceramic shaft ensure a very small coefficient of friction. Apart from this advantage known from the prior art, the bearing according to the invention has improved emergency running characteristics. One reason for this seems to be the high thermal conductivity of the ceramic material thanks to which local heat peaks that are created on the support surface can be diffused away rapidly.

What is claimed is:

1. A method of producing a composite material, in particular for sintered slide bearings with ceramic shafts, comprising the steps of:

mixing a metallic sinter material in powder form with a ceramic sinter material in powder form thereby forming a mixture, the thermal conductivity of said ceramic sinter material being at least 50 W/(m K). in a volume ratio of 3:1 to 25:1;

introducing the mixture into a predetermined mold; and sintering the mixture thereby forming a sintered composite material, the sintered composite material having an open pore volume of 10% to 30%.

2. A slide bearing, in particular for ceramic shafts consisting of a sintered mixture, the open pore volume of said slide bearing being 10% to 30%, said slide bearing formed from at least one metallic material and from at least one ceramic material, the thermal conductivity of said ceramic sinter material being at least 50 W/(m K), and a mixing volume ratio between said ceramic sinter material and said metallic sinter material being 1:25 to 1:3.

3. The slide bearing according to claim 2, wherein the thermal conductivity of said ceramic sinter material is at least 70 W(m K).

4. The slide bearing according to claim 2, wherein said ceramic sinter material consists of an aluminum nitride.

5. The slide bearing according to claim 2, wherein said ceramic sinter material consists of titanium diboride.

6. The slide bearing according to claim 2, wherein said ceramic sinter material consists of boron nitride.

7. The slide bearing according to claim 2, wherein said ceramic sinter material consists of silicon-filtered silicon carbide.

8. The slide bearing according to claim 2, wherein said ceramic sinter material consists of hot-pressed silicon carbide.

9. The slide bearing according to claim 2, wherein said ceramic sinter material consists of hot-isostatically pressed silicon carbide.

10. The slide bearing according to claim 2, wherein said ceramic sinter material consists of beryllium oxide.

11. The slide bearing according to claim 2, wherein the thermal conductivity of said ceramic sinter material is preferably 100 W(m K).

\* \* \* \* \*